(12) United States Patent
Wang et al.

(10) Patent No.: US 11,515,516 B2
(45) Date of Patent: Nov. 29, 2022

(54) METHOD OF PREPARING CATHODE MATERTAL FOR A BATTERY

(71) Applicant: BAOSHAN IRON & STEEL CO., LTD., Shanghai (CN)

(72) Inventors: Dawei Wang, St. Lucia (AU); Ian Gentle, St. Lucia (AU); Yang Li, St. Lucia (AU); Qingcong Zeng, St. Lucia (AU)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 486 days.

(21) Appl. No.: 16/063,968

(22) PCT Filed: Dec. 22, 2015

(86) PCT No.: PCT/CN2015/098194
§ 371 (c)(1),
(2) Date: Jun. 19, 2018

(87) PCT Pub. No.: WO2017/107040
PCT Pub. Date: Jun. 29, 2017

(65) Prior Publication Data
US 2020/0274144 A1 Aug. 27, 2020

(51) Int. Cl.
*H01M 4/82* (2006.01)
*H01M 4/136* (2010.01)
(Continued)

(52) U.S. Cl.
CPC ......... *H01M 4/136* (2013.01); *H01M 4/0471* (2013.01); *H01M 4/364* (2013.01);
(Continued)

(58) Field of Classification Search
CPC .... H01M 4/136; H01M 4/0471; H01M 4/364; H01M 4/623; H01M 2/1646;
(Continued)

(56) References Cited

U.S. PATENT DOCUMENTS

| 10,008,722 B2 * | 6/2018 | Hochi | H01M 4/587 |
| 2013/0302678 A1 * | 11/2013 | He | H01M 10/0525 429/213 |
| 2016/0111722 A1 * | 4/2016 | Deng | H01M 4/131 429/221 |

FOREIGN PATENT DOCUMENTS

| CN | 1883064 A | 12/2006 |
| CN | 102593416 A | 7/2012 |

(Continued)

OTHER PUBLICATIONS

Office Action, for Japanese Application No. 2018-532447, dated Oct. 1, 2019, 8 pages (with English Translation).
(Continued)

*Primary Examiner* — Raymond Alejandro
(74) *Attorney, Agent, or Firm* — Seed Intellectual Property Law Group LLP

(57) ABSTRACT

Disclosed is a method for producing polymer-encapsulated $Li_2S_x$ (where $1 \leq x \leq 2$) nanoparticles. The method comprises the step of forming a mixture of a polymer and sulfur. The method further comprises vulcanizing the mixture at a vulcanization temperature attained at a heating rate, in a vulcanization atmosphere, and electrochemically reducing a vulcanized product at a reduction potential. Also disclosed is a method for producing a battery component, the component comprising a cathode and a separator.

24 Claims, 25 Drawing Sheets

(51) Int. Cl.
- *H01M 4/04* (2006.01)
- *H01M 4/36* (2006.01)
- *H01M 4/62* (2006.01)
- *H01M 10/0525* (2010.01)
- *H01M 10/0565* (2010.01)
- *H01M 10/0569* (2010.01)
- *H01M 50/431* (2021.01)
- *H01M 4/02* (2006.01)

(52) U.S. Cl.
CPC ....... *H01M 4/623* (2013.01); *H01M 10/0525* (2013.01); *H01M 10/0565* (2013.01); *H01M 10/0569* (2013.01); *H01M 50/431* (2021.01); *H01M 2004/021* (2013.01)

(58) Field of Classification Search
CPC ........... H01M 10/052; H01M 10/0525; H01M 10/0565; H01M 10/0569; H01M 2004/021
See application file for complete search history.

(56) References Cited

FOREIGN PATENT DOCUMENTS

| | | | |
|---|---|---|---|
| CN | 103390767 A | 11/2013 | |
| CN | 103427125 A | 12/2013 | |
| CN | 103456991 A | 12/2013 | |
| CN | 103715399 A | 4/2014 | |
| JP | 2015-128063 A | 7/2015 | |
| WO | 01/39302 A1 | 5/2001 | |
| WO | WO 01/39302 * | 5/2001 | .............. H01M 4/02 |
| WO | 2013/001693 A1 | 1/2013 | |
| WO | WO 2015/050086 * | 4/2015 | ............ H01M 4/583 |
| WO | 2015/088451 A1 | 6/2015 | |

OTHER PUBLICATIONS

Office Action, for Japanese Application No. 2018-532447, dated May 12, 2020, 3 pages (with English Translation).
International Search Report, dated Sep. 21, 2016, for International Application No. PCT/CN2015/098194, 3 pages.

* cited by examiner

METHOD OF PREPARING CATHODE MATERIAL FOR A BATTERY

TECHNICAL FIELD

The present invention generally relates to polymer-encapsulated nanoparticles, and more specifically to a method or process of synthesizing or preparing a cathode including polymer-encapsulated nanoparticles. In further specific examples, polymer-encapsulated nanoparticles are formed or provided as the active material in a cathode for a battery.

BACKGROUND

Lithium-sulfur (Li—S) batteries are an attractive alternative to lithium-ion cells, possessing higher energy density and reduced cost due to the use of sulfur.

A Li—S battery typically includes a lithium metal anode and a sulfur cathode. One of the major issues with this configuration is the poor stability of the sulfur cathode; discharge operation results in the formation of polysulfide ions which can permanently bond with the lithium anode. This in turn leads to a permanent loss of the sulfur material, greatly reducing the cycle life of the battery. A solution to this problem has been to confine the polysulfides by using porous carbon.

Another issue to using a sulfur cathode is related to large-scale manufacturing. The operation of a Li—S battery requires that one electrode, either anode or cathode, contains lithium. In traditional Li—S battery design, having a sulfur cathode means that the anode must contain metallic lithium, which constitutes a handling hazard during manufacturing.

A further issue with traditional Li—S batteries lies in their separators, such as polypropylene. These are typically designed to impede electron flow while allowing ions to freely migrate between the two electrodes. Despite their basic functionality, serving only to prevent short circuiting of the anode and cathode, such separators are expensive in general.

A further issue lies with polymer binders included in a Li—S battery electrode. In general, cathode polymer binders consist of polyvinylidene fluoride (PVDF) or other water insoluble compounds. The use of organic solvents in massive amounts during fabrication of electrodes is hazardous and costly. One approach could be to use water as the solvent during battery fabrication. However, whether water-soluble binders can be beneficial to Li—S battery operation has not yet been demonstrated or fully understood.

There is a need for new or improved cathode materials and/or new or improved methods or processes of synthesizing or preparing cathode materials for Li—S batteries.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

This Summary is provided to introduce a selection of concepts in a simplified form that are further described below in the Preferred Embodiments. This Summary is not intended to identify key features or essential features of the claimed subject matter, nor is it intended to be used to limit the scope of the claimed subject matter.

According to one example aspect, there is provided a method for producing polymer-encapsulated $Li_2S_x$ (where $1 \leq x \leq 2$) nanoparticles. According to another example aspect, there is provided a method for producing a battery component, the component comprising a cathode and a separator.

According to another example aspect, there is provided a method for producing polymer-encapsulated $Li_2S_x$ (where $1 \leq x \leq 2$) nanoparticles, comprising the steps of: forming a mixture of a polymer and sulfur; vulcanizing the mixture at a vulcanization temperature attained at a heating rate, in a vulcanization atmosphere; and electrochemically reducing a vulcanized product at a reduction potential.

According to another example aspect, there is provided a method for producing a battery component, the component comprising a cathode and a separator, the method comprising the steps of: (a) producing the cathode by: forming a mixture of a polymer and elemental sulfur; vulcanizing the mixture at a vulcanization temperature attained at a heating rate, in a vulcanization atmosphere; and electrochemically reducing a vulcanized product at a reduction potential; and (b) producing the separator by: depositing cellulose filter paper on a surface of the cathode; and grafting graphene oxide onto the cellulose paper.

BRIEF DESCRIPTION OF FIGURES

Example embodiments are apparent from the following description, which is given by way of example only, of at least one preferred but non-limiting embodiment, described in connection with the accompanying figures.

PREFERRED EMBODIMENTS

Figure 1:
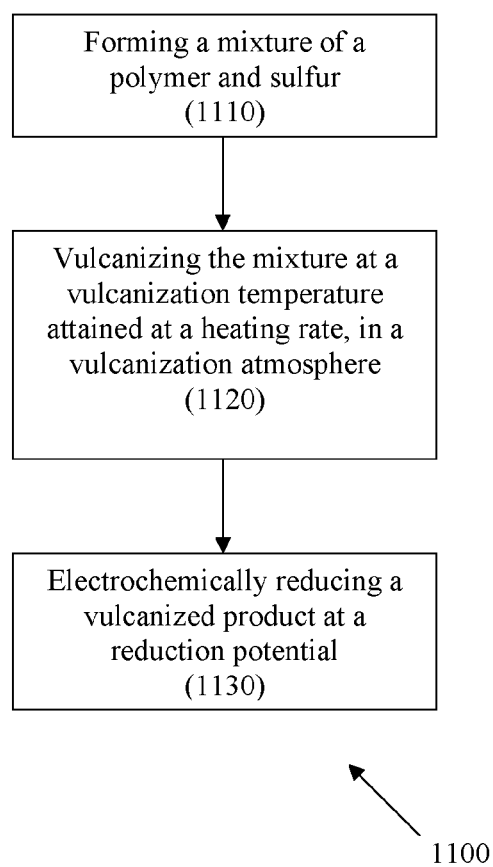
FIG. 1 illustrates an example method for producing polymer-encapsulated $Li_2S_x$ (where $1 \leq x \leq 2$) nanoparticles, demonstrated by vulcanization of a polymer with sulfur and electrochemical reduction of a vulcanized product.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

The Applicant has identified that the safety and performance of Li—S batteries can be improved by confining the lithium to the cathode as ions, rather than the traditional arrangement where the anode comprises metallic lithium. By using this modified design, it is possible to deploy lithium-free and safe anode materials, such as graphite or silicon. Advantageously, the modified design enables the realization of more durable Li—S batteries. To this end, the Applicant has developed a method for preparing polymer-encapsulated $Li_2S_x$ (where $1 \leq x \leq 2$) nanoparticles as the active cathode material. This method is composed of two basic steps: vulcanization and electrochemical reduction. During the vulcanization process, sulfur molecules are homogeneously dispersed into a polymer substrate, resulting in the uniform encapsulation of sulfur. Subsequently, the inlayed sulfur molecules are electrochemically reduced using a potential lower than, or equal to, about 1.6 V. Electrochemical reduction may occur in the presence of a binder which may be a water-soluble oxygen-containing polymer or graphene oxide. This results in a polymer-encapsulated $Li_2S_x$ nanoparticle cathode with strong confinement due to the ionic conducting polymer sheath.

Referring to FIG. 1, there is provided a method 1100 for producing polymer-encapsulated, lithium-rich $Li_2S_x$ (where $1 \leq x \leq 2$) nanoparticles. Method 1100 includes the step 1110 of forming a mixture of a polymer and sulfur. Then vulcanizing, at step 1120, the mixture at a vulcanization temperature attained at a heating rate, in a vulcanization atmosphere, to form a vulcanized product. The vulcanized product is then electrochemically reduced, at step 1130, at a reduction potential to produce polymer-encapsulated $Li_2S_x$ nanoparticles.

According to a preferred example, the polymer used in method 1100 is polyacrylonitrile (PAN), and the weight ratio of PAN to sulfur in the mixture of step 1110 is selected to be between about PAN:S=1:3 and 1:15, inclusively. PAN is used as a component in lithium ion conducting solid state polymer electrolytes. The interaction of lithium ions with the nitrile groups is responsible for the ionic conductivity. This characteristic allows the application of PAN as an ionic conducting sheathing material for $Li_2S_x$ nanoparticles. To obtain a uniform encapsulation, it is important to disperse sulfur at a molecular level in the PAN matrix. Vulcanization of PAN offers a simple and direct method for this purpose. In other examples, other types of polymers, such as polyaniline or polypyrrole, may be used in method 1100.

In another example, the heating rate during vulcanization step 1120 is selected to be between about 1° C./min and about 10° C./min, inclusively. In another example, the atmosphere throughout vulcanization step 1120 is selected as one of argon gas, nitrogen gas, or vacuum. In another example, the vulcanization temperature during vulcanization step 1120 is selected to be between about 300° C. and about 800° C., inclusively.

According to a further example, electrochemical reduction step 1130 occurs in an electrochemical cell comprising an anode, a cathode, and an electrolyte, wherein the cathode includes a nonzero percentage by weight of the vulcanized product, and wherein the reduction potential is lower than, or equal to, about 1.6 V. Preferably, though not necessarily, the reduction potential is about 1.0 V. In one example, the anode of the electrochemical cell used for electrochemical reduction may at least partially include lithium, for example the anode may be made of lithium, a lithium alloy, a lithium compound, or a mixture including lithium. Additionally, or alternatively, the anode may at least partially include graphite, or any material with a standard electrode potential close to lithium, and the electrolyte may at least partially comprise lithium ions.

Figure 2:
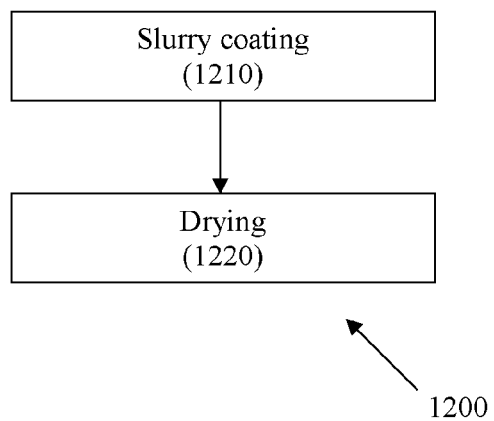
FIG. 2 illustrates an example method for preparing a cathode of an electrochemical cell to be used for electrochemical reduction.

In an example, the cathode of the electrochemical cell is prepared via a slurry coating method. FIG. 2 illustrates a method 1200 for preparing the cathode of the electrochemical cell. Method 1200 includes the step 1210 of slurry coating a surface. In one example, the surface is aluminium foil. The surface is then dried at step 1220. In an example, a slurry to slurry coat the surface is formed composed by about 70 wt % vulcanized product, about 15 wt % carbon black as a conducting agent, about 15 wt % binder, and an amount of a solvent determined by the respective binder. In another example, the composition of the slurry may include between about 5 wt % to 50 wt %, inclusively, of binder. The binder may be one of polyvinylidene fluoride (PVDF), sodium carboxymethyl cellulose (CMC), polyacrylic acid (PAA), polyvinyl alcohol (PVA), alginate, graphene oxide (GO), or any other water-soluble oxygen-containing polymer with varying polymerization degrees or with N, S groups, or mixtures thereof.

Figure 3:
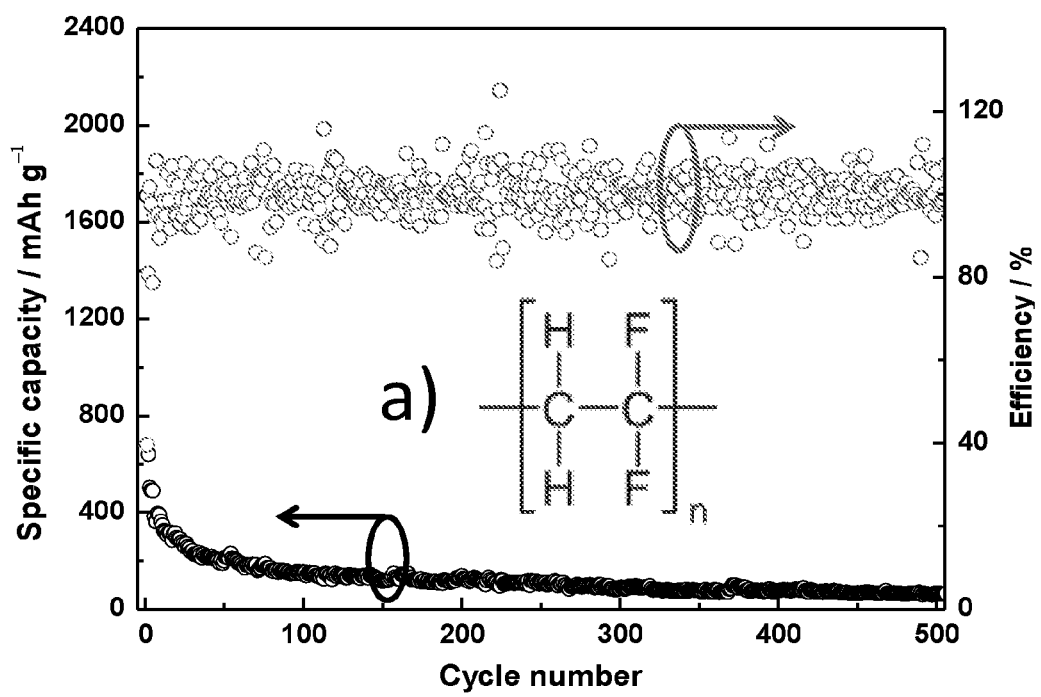
FIG. 3 illustrates cycle performance and capacity of an example polyacrylonitrile-(PAN) encapsulated $Li_2S_x$ cathode produced using PVDF as a binder.
Figure 4:
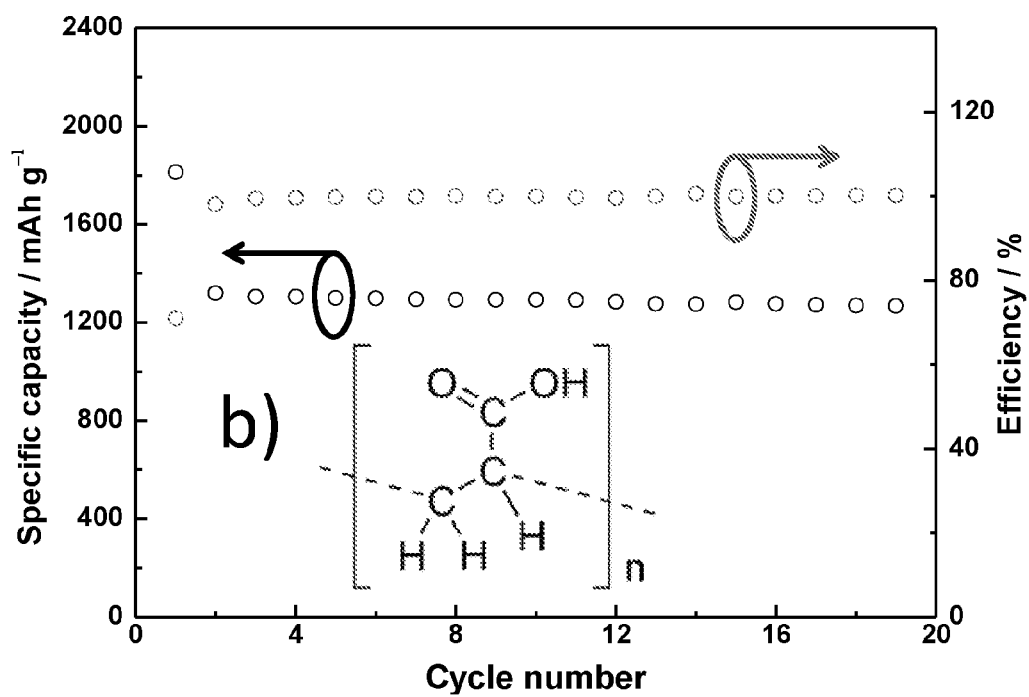
FIG. 4 illustrates cycle performance and capacity of an example PAN-encapsulated $Li_2S_x$ cathode produced using PAA as a binder.
Figure 5:
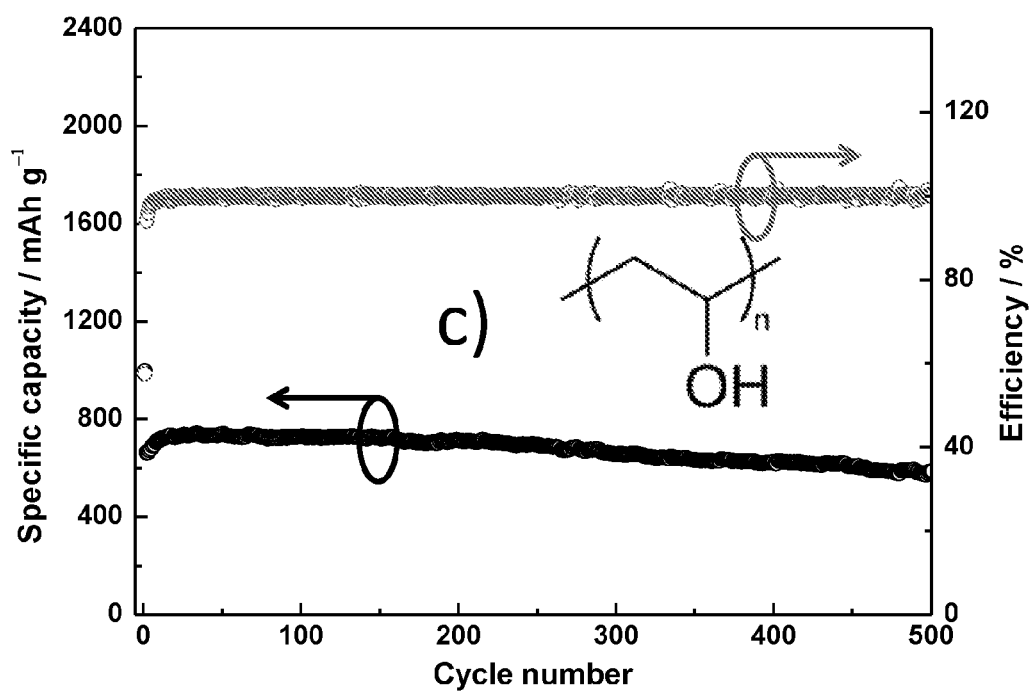
FIG. 5 illustrates cycle performance and capacity of an example PAN-encapsulated $Li_2S_x$ cathode produced using PVA as a binder.
Figure 6:
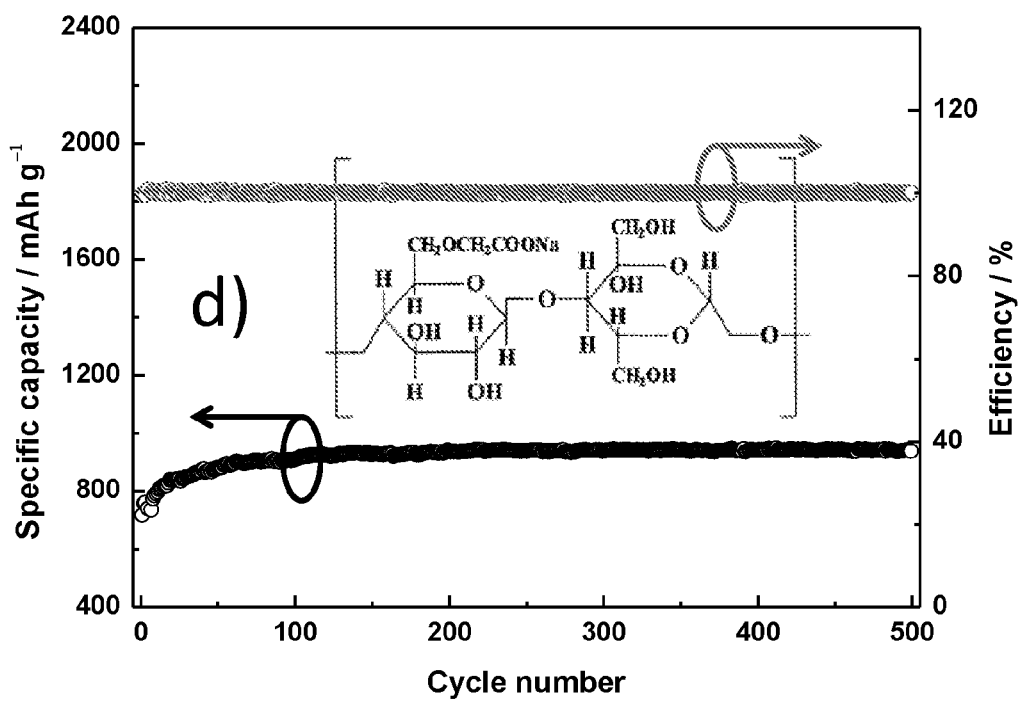
FIG. 6 illustrates cycle performance and capacity of an example PAN-encapsulated $Li_2S_x$ cathode produced using CMC as a binder.
Figure 7:
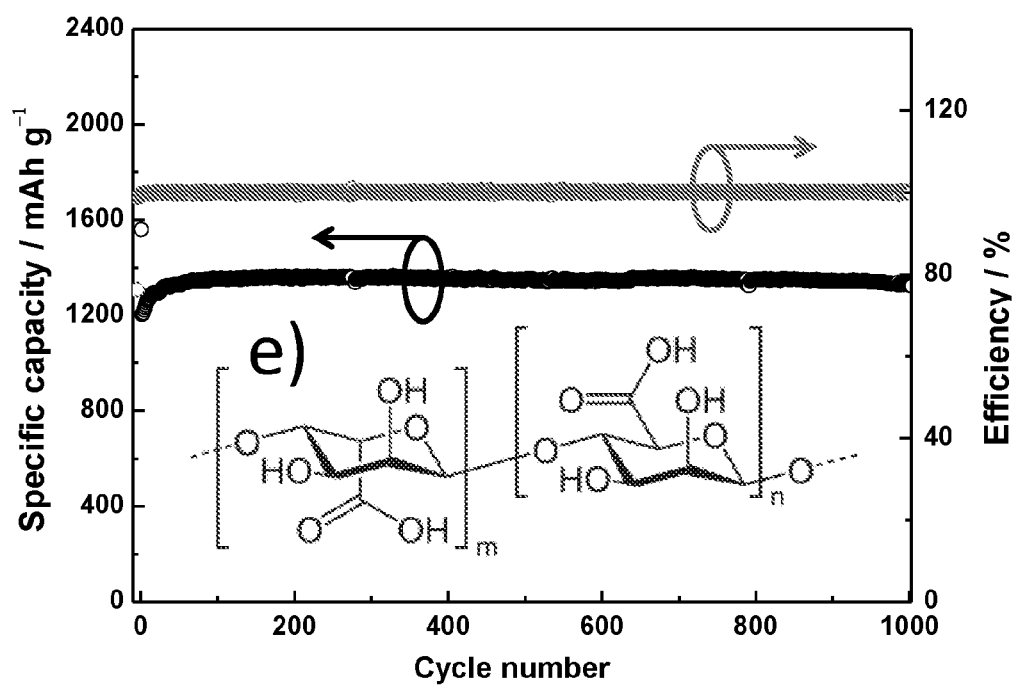
FIG. 7 illustrates cycle performance and capacity of an example PAN-encapsulated $Li_2S_x$ cathode produced using alginate as a binder.
Figure 8:
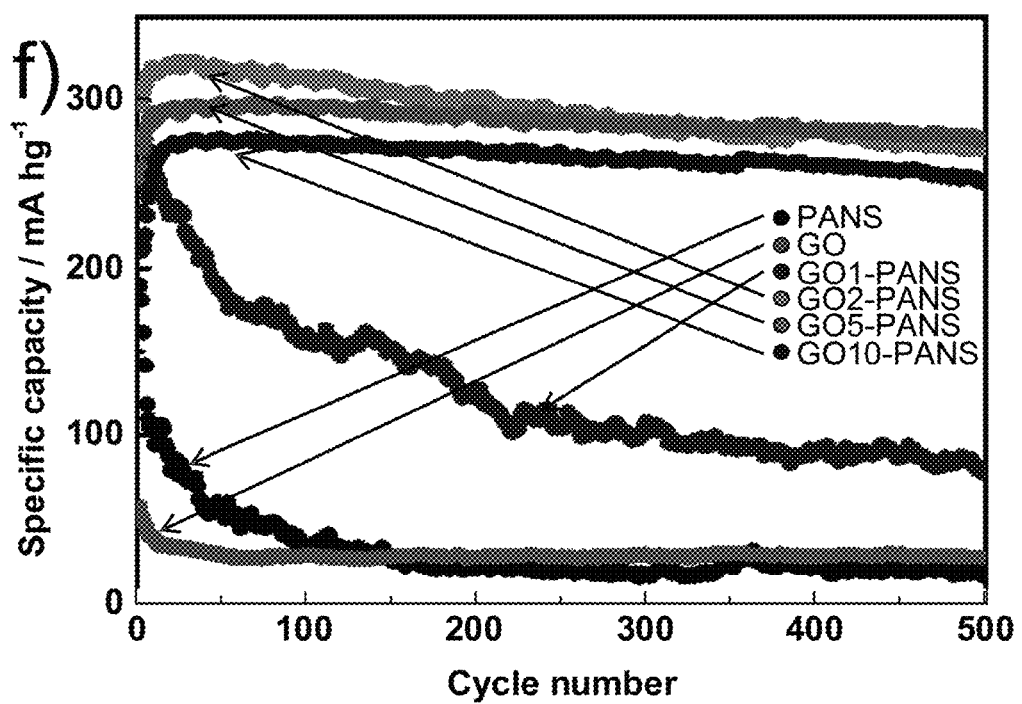
FIG. 8 illustrates cycle performance and specific capacity of an example PAN-encapsulated $Li_2S_x$ cathode produced using graphene oxide as a binder.

FIGS. 3 to 8 illustrate cycle performance (including coulombic efficiency) and specific capacity of example cathodes, including PAN-encapsulated $Li_2S_x$ nanoparticles, using different binders. FIG. 3 corresponds to PVDF; FIG. 4 corresponds to PAA; FIG. 5 corresponds to PVA; FIG. 6 corresponds to CMC; FIG. 7 corresponds to alginate; FIG. 8 corresponds to GO. These results indicate that by using water-soluble polymers, the stability of the cathode material can be greatly improved (compared to conventional PVDF binders), with relatively minor capacity reductions over more than 500 cycles. Another advantage of using water-soluble polymers as binders is that they are environmentally friendly and they allow for a reduction of production costs. Most importantly, the presence of carboxyl, carbonyl, or hydroxyl groups is found to boost capacity, in some examples by about 50%. The boosted performance is attributed to the interaction between oxygen and sulfur atoms, and the affinity between oxygen and polysulfide anions. While GO is not a polymer, it contains abundant oxygen groups. As such, it is still capable of improving the stability and capacity of the cathode.

During electrochemical reduction 1130, the sulfur molecules intercalated in the polymer substrate are reduced to $Li_2S_x$. In this process, the properties of the electrode undergo a significant change, $Li_2S_x$ being highly polar and ionic while sulfur is non-polar and covalent. It is for this reason that oxygen function groups in the binder (e.g. PAA or CMC), and the PAA's carbonyl group in particular, are able to boost the capacity of the cathode, in some examples by about 50%.

Figure 9:
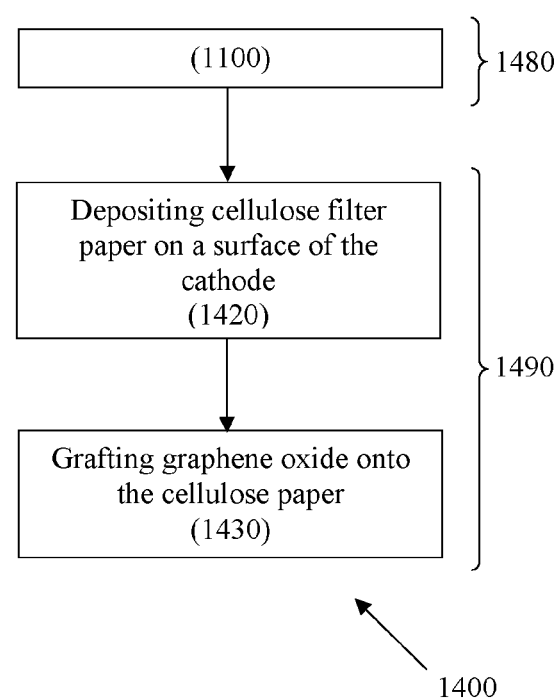
FIG. 9 illustrates an example method for producing a battery component including a cathode and a separator. The cathode includes polymer-encapsulated $Li_2S_x$ nanoparticles as the active cathode material. The separator includes graphene oxide grafted onto cellulose filter paper.

Referring to FIG. 9, there is provided a method 1400 for producing a battery component including a cathode and a separator. Method 1400 includes the steps of producing 1480 the cathode and producing 1490 the separator. Producing 1480 the cathode includes the steps of producing polymer-encapsulated, $Li_2S_x$ (where $1 \leq x \leq 2$) nanoparticles as the cathode material, according to method 1100. Producing the separator includes the step of depositing 1420 cellulose filter paper on a surface of the cathode, followed by grafting 1430 graphene oxide onto the cellulose filter paper.

Figure 10:
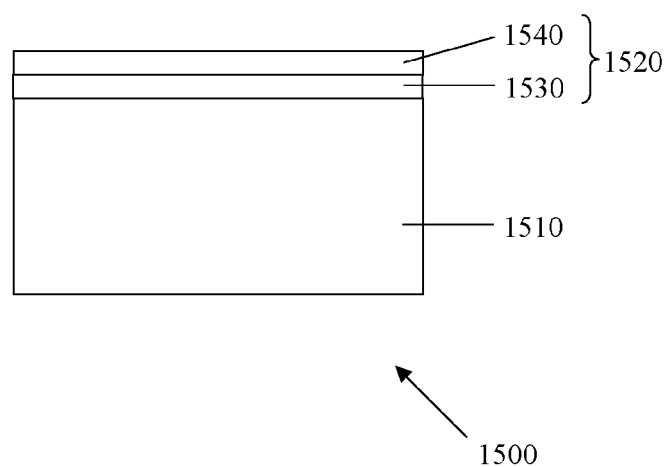
FIG. 10 illustrates an example battery component including a cathode and a separator. The cathode includes polymer-encapsulated $Li_2S_x$ nanoparticles as the active cathode material. The separator includes graphene oxide grafted onto cellulose filter paper.

FIG. 10 illustrates an example battery component 1500 produced through method 1400. Battery component 1500 includes a cathode 1510 and a separator 1520. Cathode 1510 is composed of polymer-encapsulated $Li_2S_x$ (where $1 \leq x \leq 2$) nanoparticles which act as electroactive components. In one example, cathode 1510 has a uniformly blended single layer structure integrated with electroactive components, protective components, and conducting components. Separator 1520 includes a graphene oxide membrane 1540 grafted onto a cellulose filter paper 1530, which is in turn deposited onto a surface of cathode 1510. Cellulose filter paper 1530 acts to support graphene oxide membrane 1540 and enhance its strength. Graphene oxide membrane 1540 functions to regulate ion conduction and is insulating, helping to prevent short circuiting of cathode 1510 with an anode when battery component 1500 is arranged in a battery.

Figure 11:
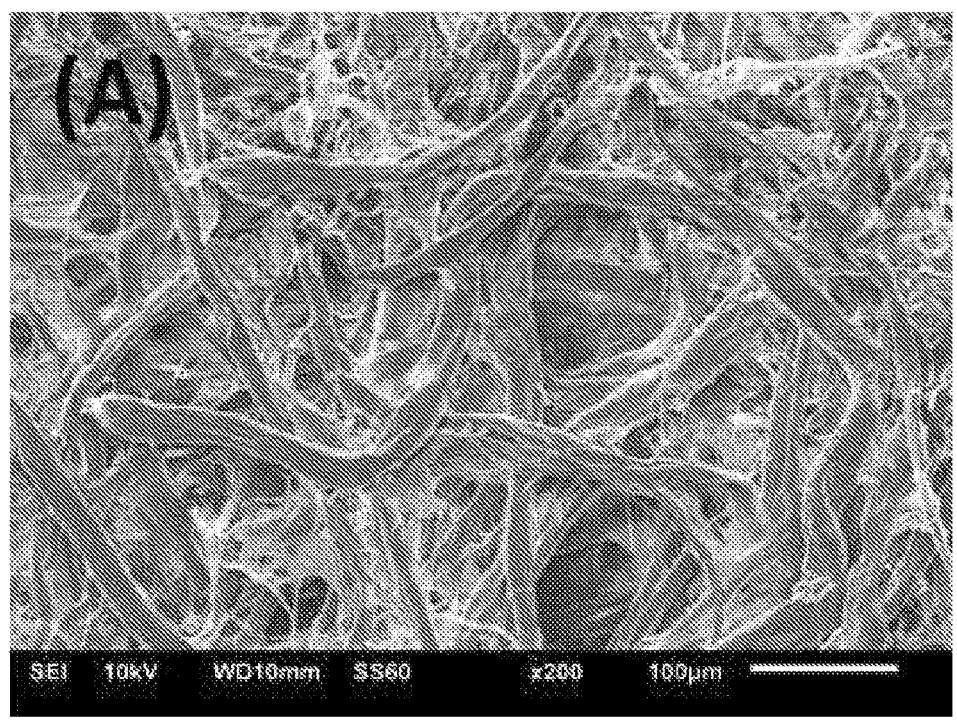
FIG. 11 illustrates a scanning electro mircroscope (SEM) image of an example cellulose separator.
Figure 12:
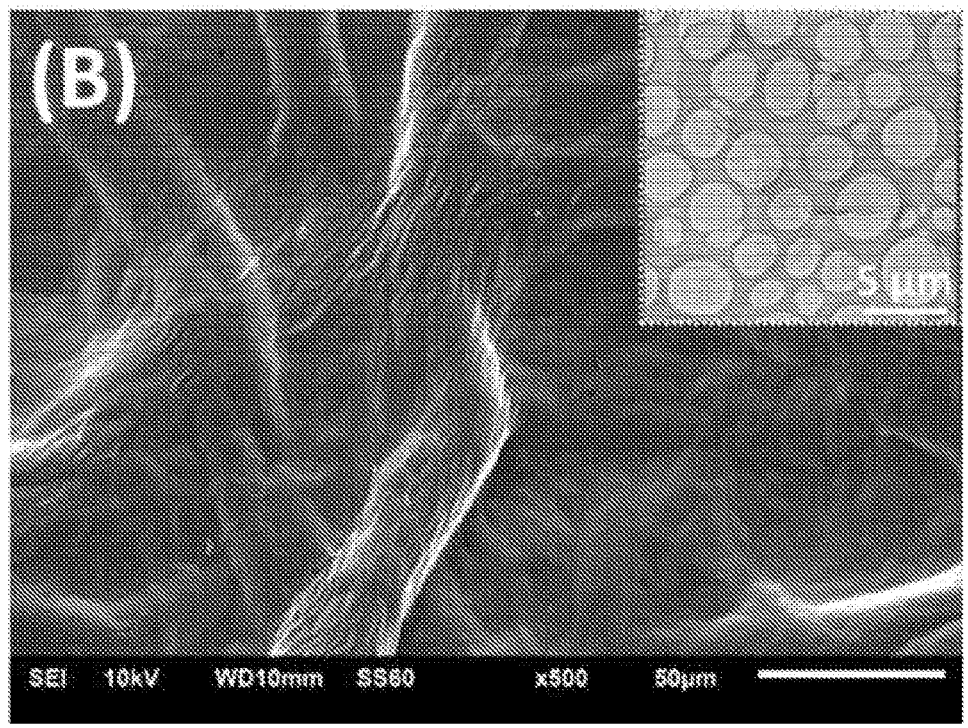
FIG. 12 illustrates an SEM image of an example graphene oxide coated cellulose separator.

FIG. 11 illustrates a scanning electron microscope (SEM) image of a cellulose separator. FIG. 12 illustrates an SEM image of a graphene oxide coated cellulose separator as described in FIG. 10. This separator can be used to replace more expensive polypropylene separators, while delivering similar performance.

FURTHER EXAMPLES

The Wowing examples provide more detailed discussion of particular embodiments. The examples are intended to be merely illustrative and not limiting to the scope of the present invention.

Example 1

Preparation of a Cathode Comprising PAN-Encapsulated $Li_2S_x$ Nanoparticles

Figure 13:
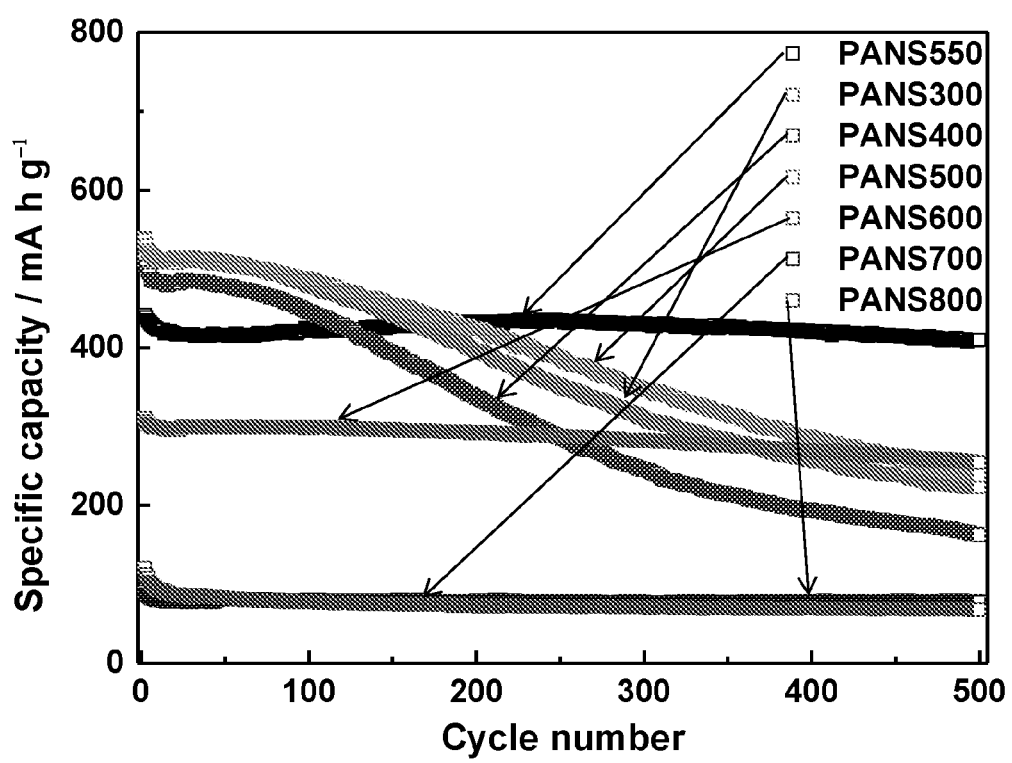
FIG. 13 illustrates cycle performance and specific capacity of example PAN-encapsulated $Li_2S_x$ cathodes produced using different vulcanization temperatures.
Figure 14:
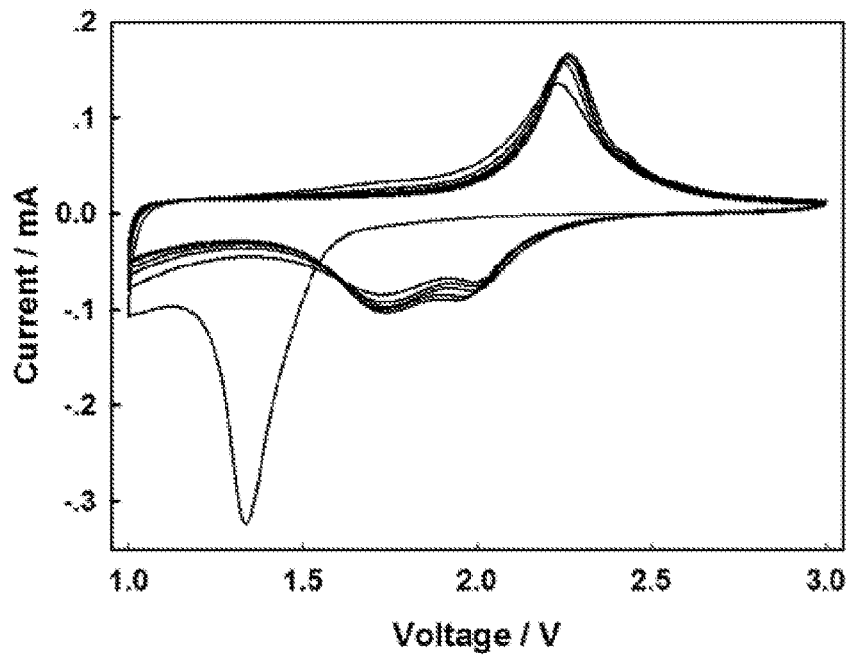
FIG. 14 illustrates a voltammogram depicting an electrochemical reduction profile applied to an example electrode including vulcanized PAN, using 1.0 V reduction potential.
Figure 15:
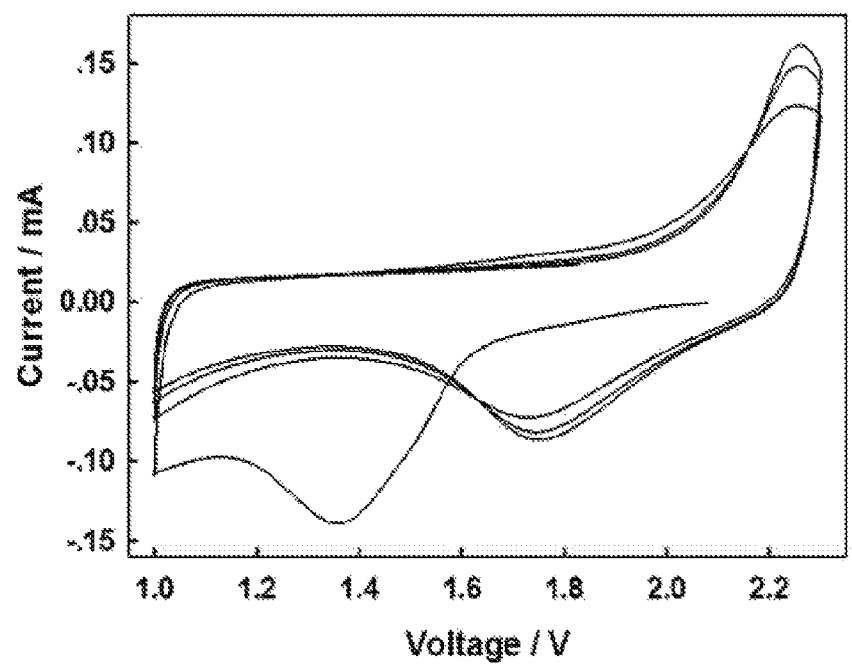
FIG. 15 illustrates a further voltammogram depicting an electrochemical reduction profile applied to an example electrode including vulcanized PAN, using 1.0 V reduction potential.
Figure 16:
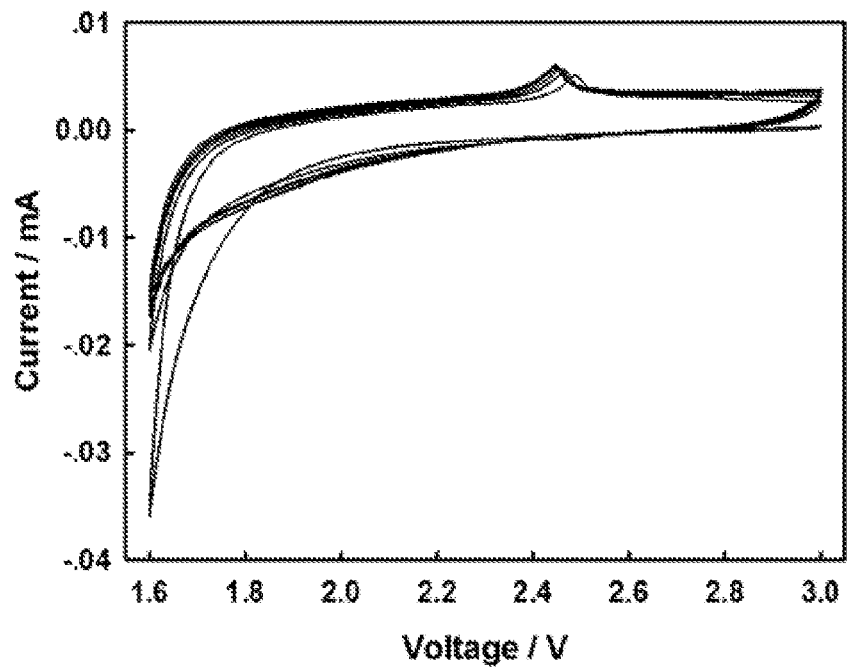
FIG. 16 illustrates a voltammogram depicting an electrochemical reduction profile applied to an example electrode including vulcanized PAN, using 1.6 V reduction potential.
Figure 17:
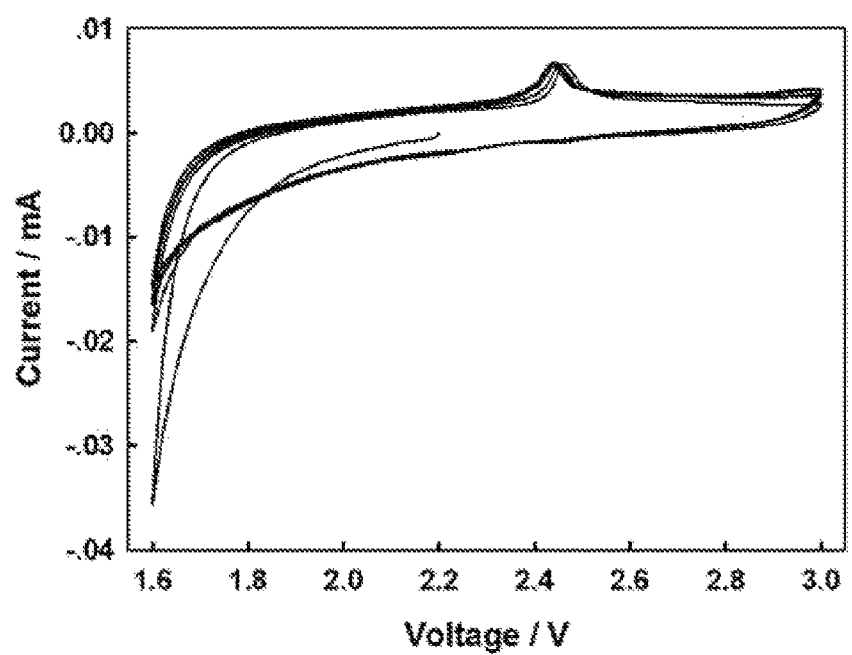
FIG. 17 illustrates a further voltammogram depicting an electrochemical reduction profile applied to an example electrode including vulcanized PAN, using 1.6 V reduction potential.

A mixture was formed by grinding commercialized PAN and elemental sulfur for thirty minutes. The weight ratio of PAN to sulfur in the grinded mixture was PAN:S=1:3, selected as the optimized ratio from the perspective of production cost. The mixture was then transferred in a tube furnace for vulcanization. The vulcanization atmosphere and heating rate were selected as nitrogen and 10° C./min, respectively. These values were determined to be optimized from the perspective of production cost. Seven different vulcanization temperatures (300° C., 400° C., 500° C., 550° C., 600° C., 700° C., 800° C.) were used throughout different trials, and the measured cycling performance for each trial is shown in FIG. 13. Based on these measurements, a temperature of 550° C. was selected as the optimized vulcanization temperature. After the temperature in the tube furnace dropped to 25° C., vulcanized PAN, namely PANS, was collected as a dark black powder with a yield of 95-105% (based on initial mass of PAN).

The vulcanized product, which in this example was PANS, included sulfur covalently bonded with the carbon in the PAN polymer matrix. This vulcanized product was then subjected to electrochemical reduction in order to reduce sulfur to $Li_2S_x$ at a suitable potential. Because the reduction occurred in-situ, the newly formed $Li_2S_x$ located preferentially at the original sites of the sulfur molecules. Thus, $Li_2S_x$ nanoparticles were encapsulated in the PAN polymer matrix. The final sample contained lithium and sulfur elements, as well as nitrogen and carbon elements from the polymer backbone.

Electrochemical reduction was carried out in a 2032 battery cell, as part of a Land battery test system. Lithium metal was used as anode material while 1.0 M LiPF6/ ethylene carbonate (EC)/dimethyl carbonate (DMC)/ethylmethyl carbonate (EMC) was used as an electrolyte. A PANS composite cathode was prepared via a slurry coating method. The slurry was composed of: about 70 wt % PANS composites, about 15 wt % carbon black as conducting agent, about 15 wt % binder, and an appropriate amount of a particular solvent for the respective binder. The slurry was then coated onto aluminium foil as the current collector and was dried in a vacuum oven at 60° C. for twelve hours after which, the cell was assembled.

Figure 18:
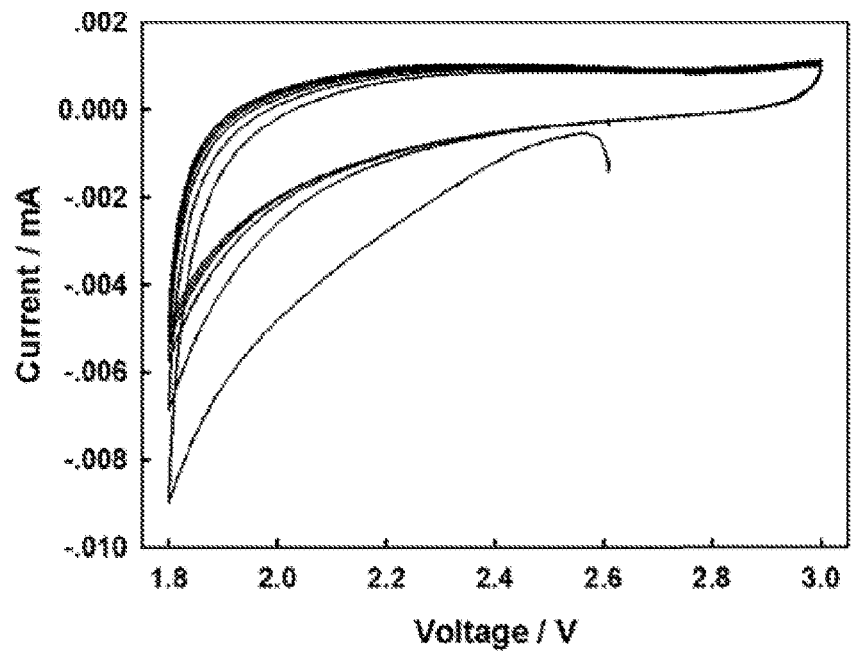
FIG. 18 illustrates a voltammogram depicting an electrochemical reduction profile applied to an example electrode including vulcanized PAN, using 1.8 V reduction potential.
Figure 19:
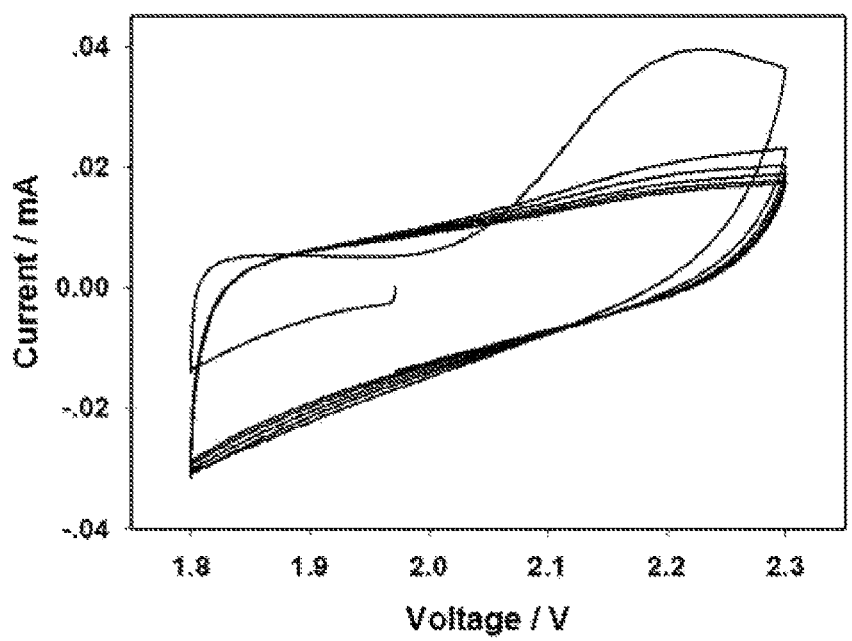
FIG. 19 illustrates a further voltammogram depicting an electrochemical reduction profile applied to an example electrode including vulcanized PAN, using 1.8 V reduction potential.

During electrochemical reduction, different binders and reduction potentials were trialed. FIGS. 3, 4, and 6 illustrate battery cycling performances measured when using three different binders. FIG. 3 corresponds to polyvinylidene fluoride (PVDF); FIG. 6 corresponds to sodium carboxymethyl cellulose (CMC); FIG. 4 corresponds to polyacrylic acid (PAA). Based on these results, PAA was determined to be the optimized binder for the PANS composite. FIGS. 14 to 19 illustrate voltammograms for when different electrochemical reduction profiles were applied to the PANS electrode. Three reduction potentials were tested: 1.0 V vs. Li/Li$^+$ (FIGS. 14 and 15), 1.6 V vs. Li/Li$^+$ (FIGS. 16 and 17), and 1.8 V vs. Li/Li$^+$ (FIGS. 18 and 19). The lack of redox peaks in FIGS. 16 to 19 indicated that only when the reduction potential was lower than 1.6 V did the sulfur molecules in the PANS electrode start to be reduced, becoming electrochemically active to store energy reversibly. The reduction process completed at around 1.2 V, as suggested by the significant reduction peak in that region. Based on these results, 1.0 V vs. Li/Li$^+$ was determined to be the optimized reduction potential to guarantee a complete reduction.

Figure 20:
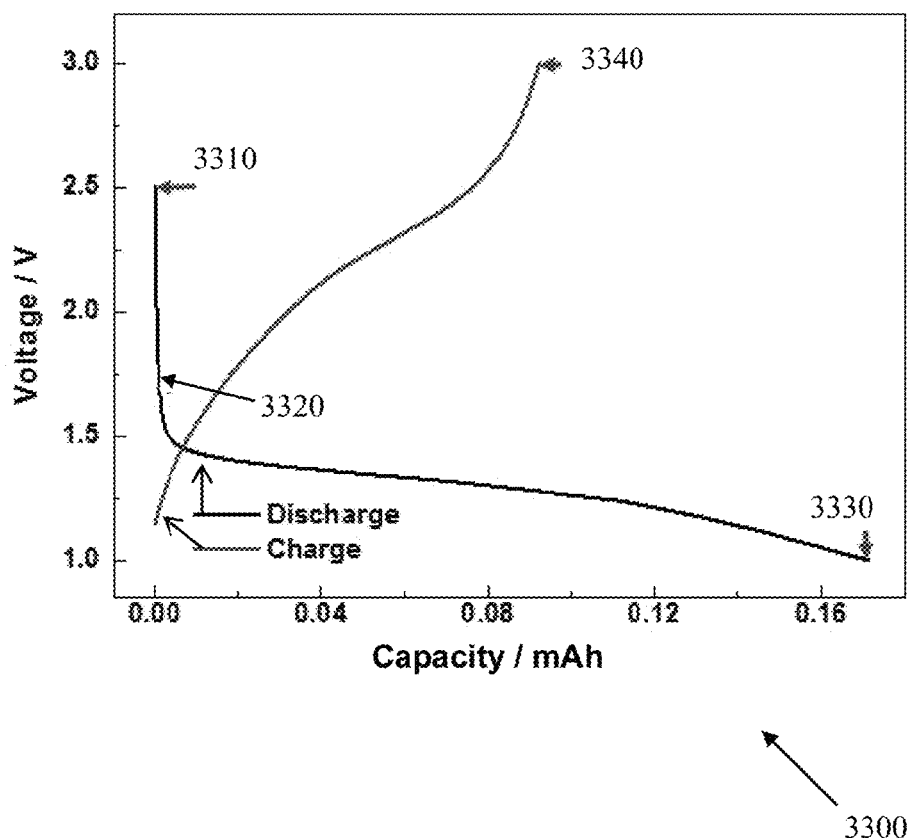
FIG. 20 illustrates a plot of the voltage versus capacity of an example reduced (discharge), and oxidized (charge) cathode during the electrochemical reduction process.
Figure 21:
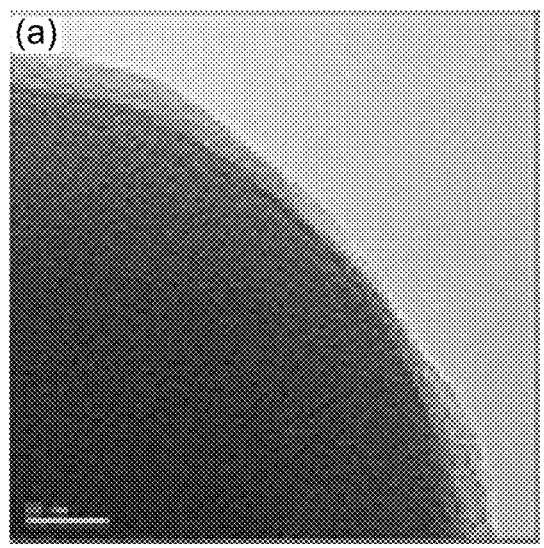
FIG. 21 illustrates a transmission electron microscope (TEM) image of an example PANS sample before electrochemical reduction.
Figure 22:
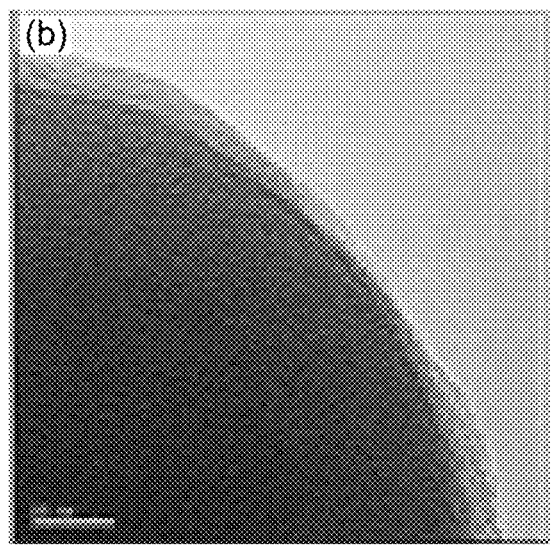
FIG. 22 illustrates a further TEM image of an example PANS sample before electrochemical reduction.
Figure 23:
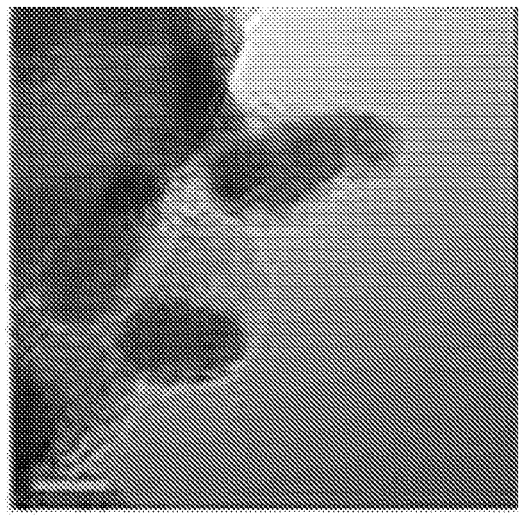
FIG. 23 illustrates a TEM image of an example PANS sample after electrochemical reduction.
Figure 24:
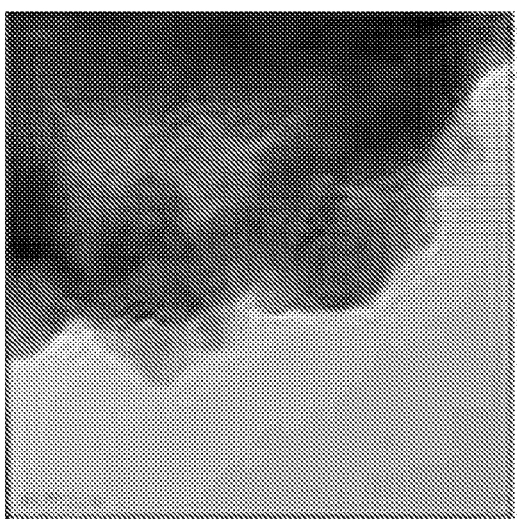
FIG. 24 illustrates a TEM image of an example PANS sample after cycling.

FIG. 20 illustrates a plot 3300 of the voltage versus capacity of the reduced (discharge), and oxidized (charge) cathode during the electrochemical reduction process. FIGS. 21 to 24 illustrate transmission electron microscope (TEM) images of the reduction process and phase separation in the electrode including vulcanized PAN. These images were used to demonstrate the existence and morphology of electrochemically active $Li_2S_x$ nanoparticles encapsulated by PAN after electrochemical reduction. FIGS. 21 and 22 illustrate a PANS sample before reduction; FIG. 23 illustrates the PANS sample after reduction, and FIG. 24 after cycling. FIG. 21 corresponds to stage 3310 in FIG. 20. FIG. 22 corresponds to stage 3320 in FIG. 20. FIG. 23 corresponds to stage 3330 in FIG. 20. FIG. 24 corresponds to stage 3340 in FIG. 20. With reference to FIGS. 21 to 24, before electrochemical reduction it can be observed that PANS has a spherical outline and a uniform microscopic texture. No obvious contrast can be observed throughout the whole sample. Such even distribution of transmitted electron signals indicated that the dispersion of sulfur molecules within the PAN substrate was molecularly homogeneous. After being reduced to 1.0 V, crystalline nanoparticles with size of around 2 nm started emerging on the surface or in the inner part of a bulk PANS spherical particle. Through characterization of its identical lattice (0.33 nm), it was confirmed that these nanoparticles were $Li_2S$ generated by electrochemical reduction. Following formation, these nanoparticles remained present even after cycling.

TEM characterization was also conducted on samples reduced at 1.6 V and 1.8 V. Consistent with the electrochemical test results, no particles emerged in the sample reduced at 1.8 V, while only a few nanoparticles started emerging in the sample reduced at 1.6 V. These results confirmed successful electrochemical synthesis of PAN-encapsulated $Li_2S_x$ nanoparticles.

Figure 25:
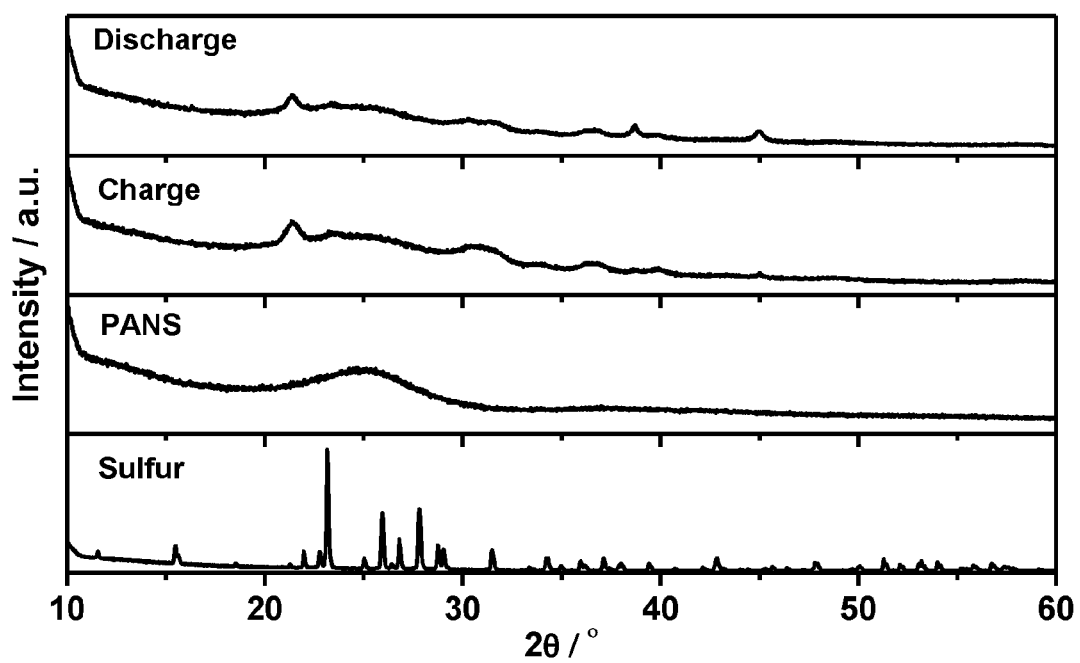
FIG. 25 illustrates X-ray diffraction profiles for the example pristine, reduced (discharge), and oxidized (charge) cathode.
Figure 26:
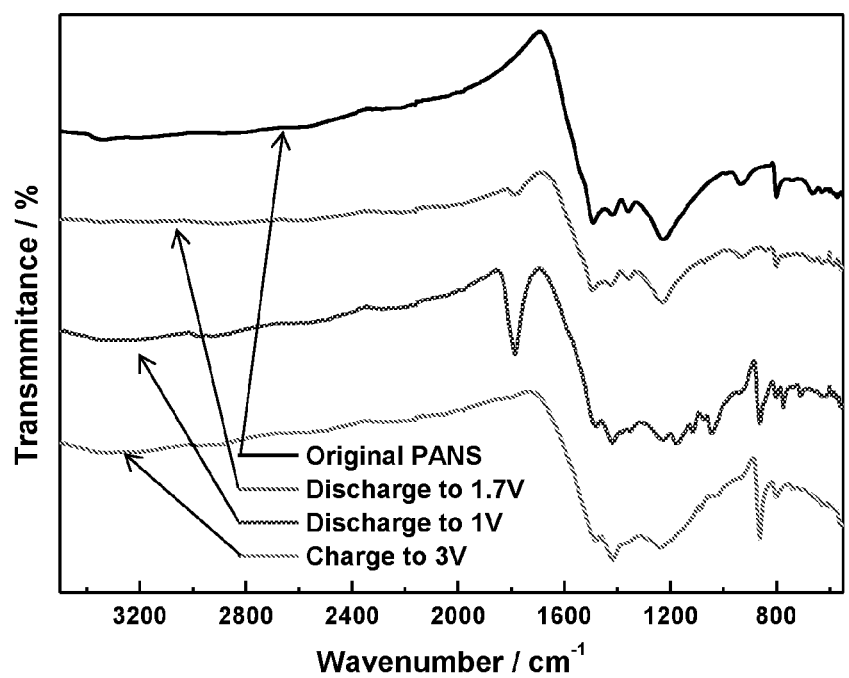
FIG. 26 illustrates Fourier transform infrared spectroscopy results for the example pristine, reduced (discharge), and oxidized (charge) cathode.
Figure 27:
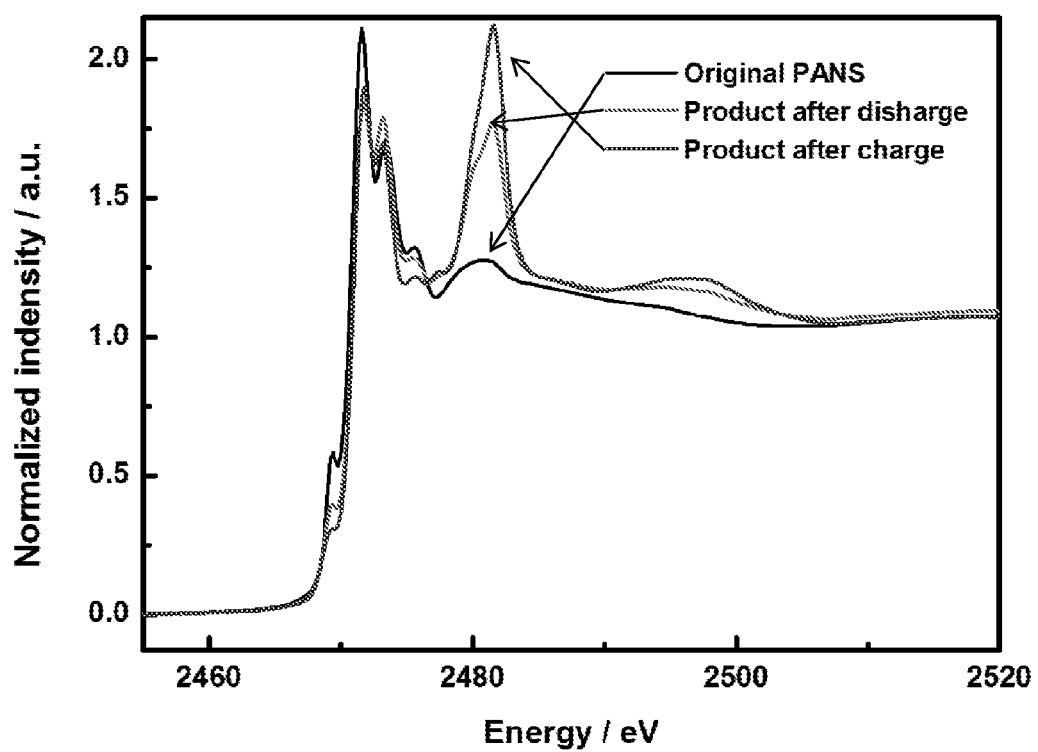
FIG. 27 illustrates X-ray absorption spectroscopy results for the example pristine, reduced (discharge), and oxidized (charge) cathode.
Figure 28:
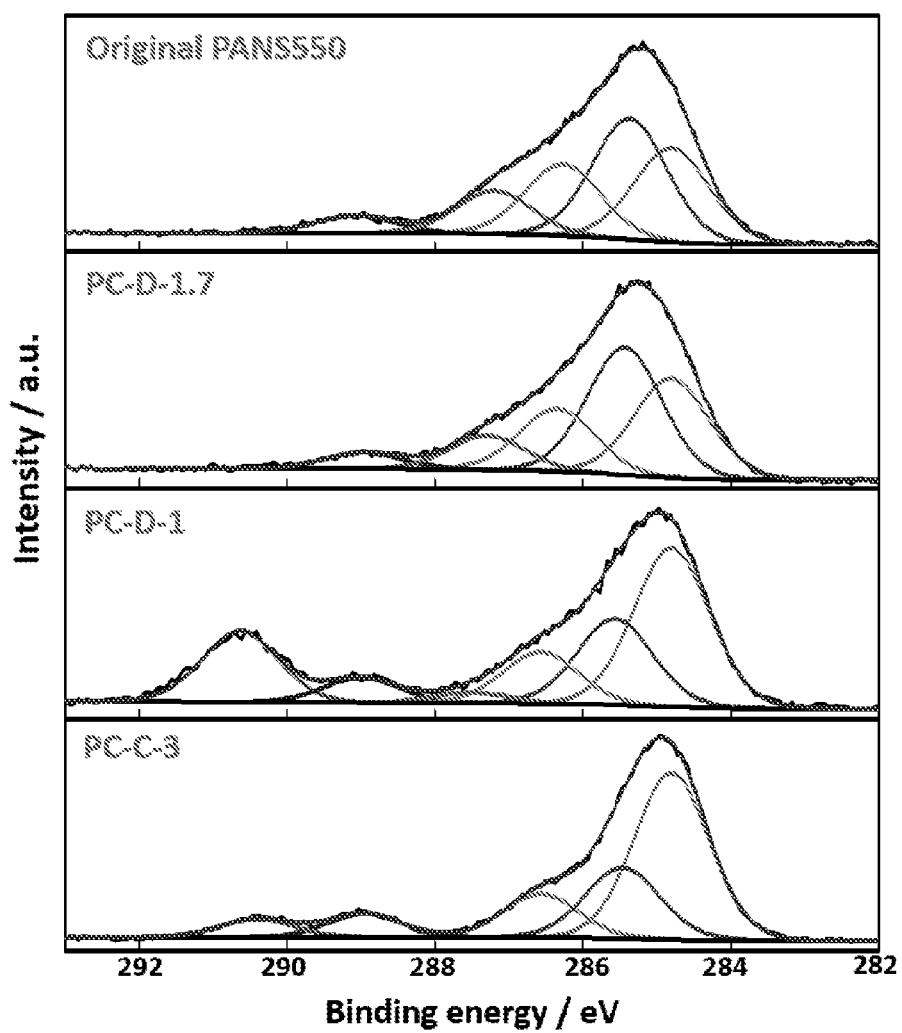
FIG. 28 illustrates X-ray photoelectron spectroscopy results for the example pristine, reduced (discharge), and oxidized (charge) cathode.
Figure 29:
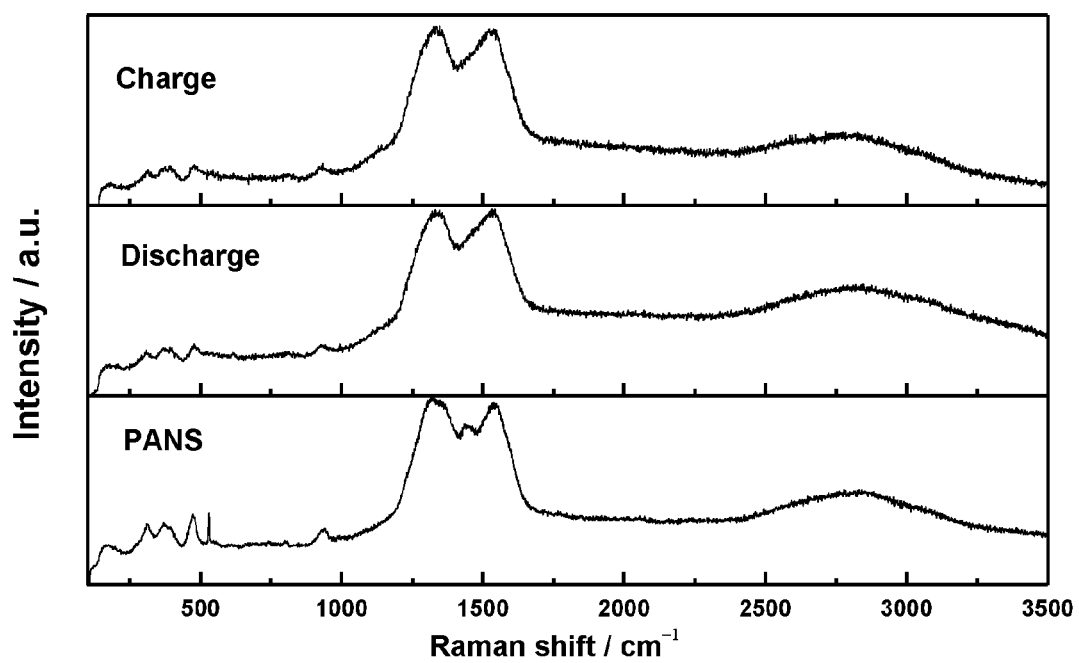
FIG. 29 illustrates Raman spectroscopy results for the example pristine, reduced (discharge), and oxidized (charge) cathode.

The structural evolution of the vulcanized PAN before and after electrochemical reduction was further characterized by combining a number of different measurements. FIG. 25 illustrates X-ray diffraction profiles for the pristine, reduced (discharge), and oxidized (charge) cathode. FIG. 26 illustrates Fourier transform infrared spectroscopy results for the pristine, reduced (discharge), and oxidized (charge) cathode. FIG. 27 illustrates X-ray absorption spectroscopy results for the pristine, reduced (discharge), and oxidized (charge) cathode. FIG. 28 illustrates X-ray photoelectron spectroscopy results for the pristine, reduced (discharge), and oxidized (charge) cathode. FIG. 29 illustrates Raman spectroscopy results for the pristine, reduced (discharge), and oxidized (charge) cathode. FIGS. 20 to 25 indicate that the formation of $Li_2S_x$ nanoparticles is irreversible, i.e. oxidation of the $Li_2S$ nanoparticles produces delithiated nanoparticles which differ from the pristine PANS. Therefore, PAN-encapsulated $Li_2S_x$ nanoparticles are suitable as an active cathode material.

Example 2

Preparation of Graphene Oxide

Graphene oxide (GO) is a two-dimensional material which contains abundant oxygen function groups. GO was synthesized through the following procedure.

6.0 g of $KMnO_4$ were slowly added to a dispersion of expandable graphite flakes (1.0 g) and 120 mL of concentrated $H_2SO_4$ under magnetic stirring in an ice bath (0° C.). After $KMnO_4$ was completely dissolved, the ice bath was removed and the resulting green-coloured solution was stirred at room temperature for four hours. To terminate the reaction, 10 mL of 30% $H_2O_2$ mixed with 100 mL of water were added. The resulting golden suspension was washed by repeat centrifugation (20,000 rpm for ten minutes) until the pH level reached 7. The residual colloidal graphite oxide was dried and re-dispersed in neutral water for long-term storage purposes.

Figure 30:
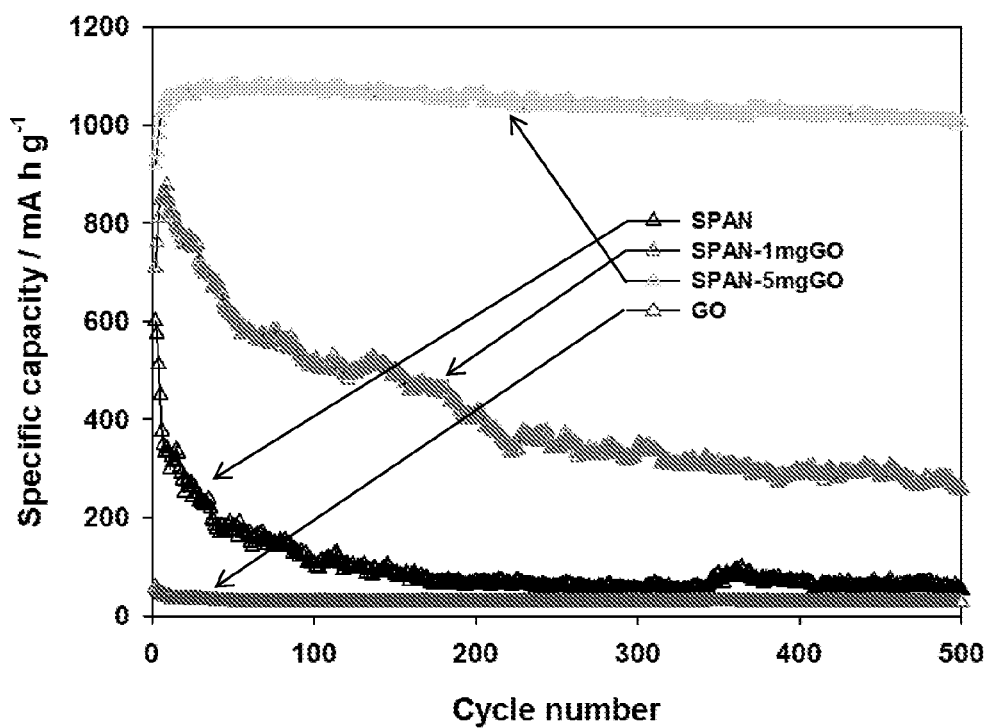
FIG. 30 illustrates cycle performance and capacity of example PAN-encapsulated $Li_2S_x$ cathodes produced using different quantities of graphene oxide binder.

To evaluate the effect of a GO binder, different amounts of GO were added to the PANS when preparing the cathode. Specifically, 1 mg and 5 mg were added into a slurry which contained 35 mg PANS during electrode preparation. FIG. 30 illustrates the cycle performance and capacity of the resulting cathode.

Optional embodiments may also be said to broadly include the parts, elements, steps and/or features referred to or indicated herein, individually or in any combination of two or more of the parts, elements, steps and/or features, and wherein specific integers are mentioned which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

The invention claimed is:

1. A method for producing polymer-encapsulated $Li_2S_x$ nanoparticles, where $1 \leq x \leq 2$, the method comprising the steps of:

forming a mixture of a polymer and sulfur, wherein the polymer is polyacrylonitrile, polyaniline or polypyrrole;

vulcanizing the mixture at a vulcanization temperature attained at a heating rate, in a vulcanization atmosphere, wherein the vulcanization temperature is higher than 500° C. and lower than 600° C.; and electrochemically reducing a vulcanized product at a reduction potential so as to reduce the sulfur to form $Li_2S_x$, wherein the $Li_2S_x$ nanoparticles are encapsulated in a matrix of the polymer.

2. The method of claim 1, wherein the polymer is polyacrylonitrile.

3. The method of claim 2, wherein the mixture of polyacrylonitrile and sulfur has a weight ratio of polyacrylonitrile to sulfur between about 1:3 to about 1:15, inclusively.

4. The method of claim 1, wherein the heating rate is between about 1° C./min to about 10° C./min, inclusively.

5. The method of claim 1, wherein the vulcanization atmosphere is argon gas, nitrogen gas, or vacuum.

6. The method of claim 1, wherein the reduction potential is less than, or equal to, about 1.6 V.

7. The method of claim 1, wherein the step of electrochemically reducing the vulcanized product occurs in a cell comprising:
    an anode;
    a cathode; and
    an electrolyte.

8. The method of claim 7, wherein the anode at least partially comprises lithium and/or the electrolyte at least partially comprises lithium ions.

9. The method of claim 7, wherein the cathode comprises a nonzero percentage by weight of the vulcanized product.

10. The method of claim 7, wherein the cathode is prepared via a method comprising the steps of:
    slurry coating a surface; and
    drying the surface.

11. The method of claim 10, wherein a slurry used for slurry coating comprises:
    the vulcanized product;
    a conducting agent;
    a binder; and
    a solvent.

12. The method of claim 11, wherein the binder comprises polyvinylidene fluoride, sodium carboxymethyl cellulose, polyacrylic acid, polyvinyl alcohol, alginate, graphene oxide, or mixtures thereof.

13. A method for producing a battery component, the component comprising a cathode and a separator, the method comprising the steps of:
    producing the cathode by:
        forming a mixture of a polymer and elemental sulfur, wherein the polymer is polyacrylonitrile, polyaniline or polypyrrole;
        vulcanizing the mixture at a vulcanization temperature attained at a heating rate, in a vulcanization atmosphere, wherein the vulcanization temperature is higher than 500° C. and lower than 600° C.; and
        electrochemically reducing a vulcanized product at a reduction potential so as to reduce the sulfur to form $Li_2S_x$, thereby forming $Li_2S_x$ nanoparticles encapsulated in a matrix of the polymer; and
    producing the separator by:
        depositing cellulose filter paper on a surface of the cathode; and
        grafting graphene oxide onto the cellulose paper.

14. The method of claim 13, wherein the polymer is polyacrylonitrile.

15. The method of claim 14, wherein the mixture of PAN and sulfur has a weight ratio of PAN to sulfur between about 1:3 to about 1:15, inclusively.

16. The method of claim 13, wherein the heating rate is between about 1° C./min to about 10° C./min, inclusively.

17. The method of claim 13, wherein the vulcanization atmosphere is argon gas, nitrogen gas, or vacuum.

18. The method of claim 13, wherein the reduction potential is less than, or equal to, about 1.6 V.

19. The method of claim 13, wherein the step of electrochemically reducing the vulcanized product occurs in a cell comprising:
    an anode;
    a cathode; and
    an electrolyte.

20. The method of claim 19, wherein the anode at least partially comprises lithium and/or the electrolyte at least partially comprises lithium ions.

21. The method of claim 19, wherein the cathode comprises a nonzero percentage by weight of the vulcanized product.

22. The method of claim 19, wherein the cathode is prepared via a method comprising the steps of:
    slurry coating a surface; and
    drying the surface.

23. The method of claim 22, wherein a slurry used for slurry coating comprises:
    the vulcanized product;
    a conducting agent;
    a binder; and
    a solvent.

24. The method of claim 23, wherein the binder comprises polyvinylidene fluoride, sodium carboxymethyl cellulose, polyacrylic acid, polyvinyl alcohol, alginate, graphene oxide, or mixtures thereof.

* * * * *